United States Patent

Marzolla et al.

(10) Patent No.: US 10,875,945 B2
(45) Date of Patent: Dec. 29, 2020

(54) PROPYLENE BASED TERPOLYMER

(71) Applicant: BASELL POLIOLEFINE ITALIA S.R.L., Milan (IT)

(72) Inventors: Roberta Marzolla, Ferrara (IT); Paola Massari, Ferrara (IT); Nicoletta Martini, Ferrara (IT); Marco Ciarafoni, Ferrara (IT); Tiziana Caputo, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 10 days.

(21) Appl. No.: 15/559,374

(22) PCT Filed: Mar. 14, 2016

(86) PCT No.: PCT/EP2016/055445
§ 371 (c)(1),
(2) Date: Sep. 18, 2017

(87) PCT Pub. No.: WO2016/146578
PCT Pub. Date: Sep. 22, 2016

(65) Prior Publication Data
US 2018/0066086 A1 Mar. 8, 2018

(30) Foreign Application Priority Data
Mar. 19, 2015 (EP) .................................... 15159865

(51) Int. Cl.
*C08F 210/06* (2006.01)
*C08J 5/18* (2006.01)
(52) U.S. Cl.
CPC ............... *C08F 210/06* (2013.01); *C08J 5/18* (2013.01); *C08J 2323/14* (2013.01)
(58) Field of Classification Search
CPC .................... C08F 210/06; C09J 5/18
See application file for complete search history.

(56) References Cited

U.S. PATENT DOCUMENTS

| 4,433,110 | A | * | 2/1984 | Baba ..................... C08F 297/08 525/247 |
| 5,001,176 | A | * | 3/1991 | Nakazima ................ C08K 5/05 524/108 |
| 5,538,804 | A | * | 7/1996 | Ogale ..................... B32B 27/06 428/515 |
| 5,948,547 | A | * | 9/1999 | Mikielski ................ B32B 27/32 428/516 |
| 2014/0121325 | A1 | | 5/2014 | Holtcamp et al. |

FOREIGN PATENT DOCUMENTS

| CN | 1898307 | A | | 1/2007 | |
| CN | 103764732 | A | | 4/2014 | |
| EP | 1243612 | A2 | | 9/2002 | |
| EP | 2020291 | | * | 2/2009 | ............. B32B 27/00 |
| EP | 2143760 | | * | 1/2010 | ............. C08L 23/14 |
| EP | 2666793 | A1 | | 11/2013 | |
| EP | 2743307 | A1 | * | 6/2014 | ............. C08L 23/142 |
| JP | S5998140 | A | | 6/1984 | |
| JP | 10204232 | A | * | 8/1998 | ............. C08F 4/658 |
| JP | 2010242046 | | * | 10/2010 | ............. C08L 23/10 |
| WO | WO-9858971 | A1 | | 12/1998 | |
| WO | WO-2009019169 | A1 | | 2/2009 | |

OTHER PUBLICATIONS

EP-2743307_Jun. 2014.*
JP-10204232_Aug. 1998_English Translation.*
JP-2010242046_Oct. 2010_English Translation.*
PCT International Search Report and Written Opinion for Corresponding PCT/EP2016/055445 dated May 18, 2016 (May 18, 2016).

* cited by examiner

*Primary Examiner* — Michael L Leonard

(57) ABSTRACT

A propylene, ethylene, 1-butene terpolymer made from or containing a) from about 1.8 wt % to about 5.9 wt % of ethylene derived units; and b) from about 2.0 wt % to about 4.5 wt % of 1 butene derived units; and having i) a ratio of C2 wt %/C4 wt % in the range from about 0.9 to about 1.3; wherein C2 wt % is the weight percent of ethylene derived units and C4 wt % is the weight percent of 1-butene derived units; ii) a Melt flow rate (determined according to ISO 1133 230° C., 2.16 kg) in the range from about 1.0 to about 30.0 g/10 min; and iii) a xylene soluble fraction at 25° C. between about 10 wt % and about 30 wt %. The weight percentages are based upon the total weight of the terpolymer.

7 Claims, No Drawings

PROPYLENE BASED TERPOLYMER

This application is the U.S. National Phase of PCT International Application PCT/EP2016/055445, filed Mar. 14, 2016, claiming benefit of priority to European Patent Application No. 15159865.3, filed Mar. 19, 2015, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to a propylene, ethylene, 1-butene terpolymer having good optical and mechanical properties and low sealing initiating temperature (SIT) on films.

BACKGROUND OF THE INVENTION

Films made from propylene copolymers or terpolymers are characterized as having better impact, lower rigidity, and better transparency than films made from propylene homopolymers. It can be difficult balancing those characteristics.

SUMMARY OF INVENTION

In a general embodiment, the present disclosure provides a propylene, ethylene, 1-butene terpolymer made from or containing:
a) from about 1.8 wt % to about 5.9 wt % of ethylene derived units, based upon the total weight of the terpolymer; and
b) from about 2.0 wt % to about 4.5 wt % of 1 butene derived units, based upon the total weight of the terpolymer; and having
a ratio of C2 wt %/C4 wt % in the range from about 0.9 to about 1.3; wherein C2 wt % is the weight percent of ethylene derived units and C4 wt % is the weight percent of 1-butene derived units, both weight percentages based upon the total weight of the terpolymer;
a Melt flow rate (determined according to ISO 1133 230° C., 2.16 kg) in the range from about 1.0 to about 30.0 g/10 min; and
a xylene soluble fraction at 25° C. between about 10 wt % and about 30 wt %, based upon the total weight of the terpolymer.

DETAILED DESCRIPTION OF THE INVENTION

In a general embodiment, the present disclosure provides a propylene, ethylene, 1-butene terpolymer made from or containing:
a) from about 1.8 wt % to about 5.9 wt %, based upon the total weight of the terpolymer, alternatively from about 3.3 wt % to about 4.6 wt %; alternatively from about 3.5 wt % to about 4.4 wt % of ethylene derived units; and
b) from about 2.0 wt % to about 4.5 wt %, based upon the total weight of the terpolymer, alternatively from about 2.8 wt % to about 4.2 wt %; alternatively from about 3.2 wt % to about 4.0 wt % of 1 butene derived units; and having
a ratio of C2 wt %/C4 wt % in the range from about 0.9 to about 1.3; alternatively from 0.9 to 1.2; alternatively from about 1.0 to about 1.1; wherein C2 wt % is the weight percent of ethylene derived units and C4 wt % is the weight percent of 1-butene derived units, both weight percentages based upon the total weight of the terpolymer;
a Melt flow rate (determined according to ISO 1133 230° C., 2.16 kg) in the range from about 1.0 to about 30.0 g/10 min; alternatively from about 3.0 to about 25.0 g/10 min, alternatively from about 4.0 to about 15.0 g/10 min; and
a xylene soluble fraction at 25° C. is between about 10.0 wt % and about 30.0 wt %; alternatively between about 12.0 wt % to about 25.0 wt %; alternatively from about 15.5 wt % to about 21 wt %, based upon the total weight of the terpolymer.

As used in this specification and the claims, the term "terpolymer" means a polymer made from or containing propylene, ethylene and 1-butene derived units.

In some embodiments, the terpolymer has a haze measured on 50 µm cast film lower than about 0.18%, alternatively lower than about 0.15% alternatively lower than about 0.13%.

In some embodiments, the terpolymer has a sealing initiation temperature (SIT), lower than about 110.0° C.; alternatively lower than about 108.0° C., alternatively lower than about 107.5° C.

In some embodiments, the terpolymer is obtained with a polymerization process carried out in a gas-phase reactor having two interconnected polymerization zones.

An example of a polymerization process carried out in a gas-phase polymerization reactor having at least two interconnected polymerization zones is described in the European Patent No. EP 782587, incorporated herein by reference.

The process is carried out in a first and in a second interconnected polymerization zone to which propylene, ethylene and 1-butene are fed in the presence of a catalyst system and from which the polymer produced is discharged. The growing polymer particles flow through the first of the polymerization zones (riser) under fast fluidization conditions, leave the first polymerization zone and enter the second of the polymerization zones (downcomer) through which the polymer particles flow in a densified form under the action of gravity, leave the second polymerization zone and are reintroduced into the first polymerization zone, thus establishing a circulation of polymer between the two polymerization zones. The conditions of fast fluidization in the first polymerization zone is established by feeding the monomers gas mixture below the point of reintroduction of the growing polymer into the first polymerization zone. The velocity of the transport gas into the first polymerization zone is higher than the transport velocity under the operating conditions and is between about 2 and about 15 m/s. In the second polymerization zone, where the polymer flows in densified form under the action of gravity, high values of density of the solid are reached which approach the bulk density of the polymer; a positive gain in pressure can thus be obtained along the direction of flow, so that the process may reintroduce the polymer into the first reaction zone without the help of mechanical means. In this way, a "loop" circulation is set up, which is defined by the balance of pressures between the two polymerization zones and by the head loss introduced into the system. Optionally, one or more inert gases, such as nitrogen or an aliphatic hydrocarbon, are maintained in the polymerization zones, in such quantities that the sum of the partial pressures of the inert gases is between about 5 and about 80% of the total pressure of the gases. In some embodiments, the operating parameters are useful in gas-phase olefin polymerization processes for other polyolefin compositions, including an operating temperature in the range between about 50° C. and about 120° C. The process can be carried out under operating pressure of between about 0.5 and about 10 MPa, alternatively between about 1.5 and about 6 MPa.

In some embodiments, the various catalyst components are fed to the first polymerization zone, at any point of the first polymerization zone. However, the catalyst components can also be fed at any point of the second polymerization zone. Molecular weight regulators can be used to regulate the molecular weight of the growing polymer. In some embodiments, the molecular weight regulator is hydrogen.

In some embodiments, the Ziegler-Natta catalysts for producing the propylene terpolymers are made from or contain a solid catalyst component made from or containing at least one titanium compound having at least one titanium-halogen bond and at least an electron-donor compound (internal donor), both supported on magnesium chloride. The Ziegler-Natta catalysts systems are further made from or contain an organo-aluminum compound and optionally an external electron-donor compound.

In some embodiments, the catalysts systems are as described in the European Patent Nos. EP45977, EP361494, EP728769, and EP 1272533 and Patent Cooperation Treaty Publication No. WO00/63261, incorporated herein by reference.

In some embodiments, the solid catalyst component is made from or contains Mg, Ti, a halogen and an electron donor selected from mono- and diesters of aromatic dicarboxylic acids having the —COOH groups into ortho position, wherein at least one of the R hydrocarbyl radical of the —COOR groups contains from 1 to 20 carbon atoms. In some embodiments, the electron donor is selected from the group consisting of di-n-propyl, di-n-butyl, diisobutyl, di-n-heptyl, di-2-ethylhexyl, di-n-octyl, and di-neopentil phthalates.

In some embodiments, the solid catalyst component is prepared by reacting a titanium compound of formula $Ti(OR)_{n-y}X_y$, where n is the valence of titanium and y is a number between 1 and n, with a magnesium chloride deriving from an adduct of formula $MgCl_2 \cdot pROH$, where p is a number between 0.1 and 6, alternatively from 2 to 3.5, and R is a hydrocarbon radical having 1-18 carbon atoms. In some embodiments, the titanium compound is $TiCl_4$. In some embodiments, the adduct is prepared in spherical form by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles. In some embodiments, the spherical adducts are prepared according to a procedure described in U.S. Pat. No. 4,399,054 or 4,469,648, both patents incorporated herein by reference. In some embodiments, the adduct can be directly reacted with the Ti compound. In other embodiments, the adduct can be subjected to thermal controlled dealcoholation (80-130° C.) to obtain an adduct in which the number of moles of alcohol is lower than about 3, alternatively between about 0.1 and about 2.5. In some embodiments, the reaction with the Ti compound can be carried out by suspending the adduct in cold $TiCl_4$ (about 0° C.); the mixture is heated up to 80-130° C. and kept at this temperature for 0.5-2 hours. The treatment with $TiCl_4$ can be carried out one or more times. The internal donor can be added during the treatment with $TiCl_4$ and the treatment with the electron donor compound can be repeated one or more times. The internal electron donor compound is used in molar ratio with respect to the $MgCl_2$ of from about 0.01 to about 1, alternatively from about 0.05 to about 0.5. In some embodiments, the preparation of catalyst components in spherical form occurs as described in European Patent Application No. EP-A-395083 or Patent Cooperation Treaty Publication No. WO98/44009, both incorporated herein by reference. In some embodiments, the solid catalyst components show a surface area (by B.E.T. method) between about 20 and about 500 $m^2/g$, alternatively between about 50 and about 400 $m^2/g$, and a total porosity (by B.E.T. method) higher than about 0.2 $cm^3/g$, alternatively between about 0.2 and about 0.6 $cm^3/g$. In some embodiments, the porosity (Hg method) due to pores with radius up to about 10.000 Å ranges from about 0.3 to about 1.5 $cm^3/g$, alternatively from about 0.45 to about 1 $cm^3/g$.

In some embodiments, the organo-aluminum compound is an alkyl-Al selected from the trialkyl aluminum compounds. In some embodiments, the organo-aluminum compound is selected from the group consisting of triethylaluminum, triisobutylaluminum, tri-n-butylaluminum, tri-n-hexylaluminum, and tri-n-octylaluminum. In some embodiments, mixtures of trialkylaluminum are used with alkylaluminum halides, alkylaluminum hydrides or alkylaluminum sesquichlorides. In some embodiments, the alkylaluminum sesquichloride is selected from the group consisting of $AlEt_2Cl$ and $Al_2Et_3Cl_3$.

In some embodiments, the external electron-donor compounds include silicon compounds, esters, heterocyclic compounds and ketones. In some embodiments, the external electron-donor compound is selected from the group consisting of ethyl 4-ethoxybenzoate and 2,2,6,6-tetramethyl piperidine. In some embodiments, the external donor compounds is that of silicon compounds of formula $R_a^5R_b^6Si(OR^7)_c$, where a and b are integer from 0 to 2, c is an integer from 1 to 3 and the sum (a+b+c) is 4; $R^5$, $R^6$, and $R^7$, are alkyl, cycloalkyl or aryl radicals with 1-18 carbon atoms optionally containing heteroatoms. In some embodiments, the external donor compounds are selected from the group consisting of methylcyclohexyldimethoxysilane, diphenyldimethoxysilane, diisopropyldimethoxysilane, methyl-t-butyl dimethoxysilane, dicyclopentyldimethoxysilne, 2-ethylpiperidinyl-2-t-butyldimethoxysilane, 1,1,1, trifluoropropyl-2-ethylpiperidinyl-dimethoxysilane and 1,1, 1,trifluoropropyl-metil-dimethoxysilane. In some embodiments, the external electron donor compound is used in such an amount to give a molar ratio between the organo-aluminum compound and the electron donor compound of from about 0.1 to about 500.

The catalytic system can be pre-contacted (pre-polymerized) with small amounts of olefins. The molecular weight of the propylene terpolymers can be regulated by using regulators, such as hydrogen.

In some embodiments, the terpolymer is useful for applications such as cast films and oriented films, BOPP films, heat-sealable films and applications requiring heat sealability and softness.

In some embodiments, the propylene terpolymers are further made from or to contain at least one nucleating agent. In some embodiments, the propylene terpolymers are made from or contain up to about 2500 ppm, alternatively from about 500 to about 2000 ppm, of at least one nucleating agent.

In some embodiments, the propylene terpolymers made from or containing at least one nucleating agent are useful for producing blown films.

In some embodiments, the nucleating agent in selected from the group consisting of inorganic additives, salts of monocarboxylic or polycarboxylic acids, dibenzylidenesorbitol or its $C_1$-$C_8$-alkyl-substituted derivatives or salts of diesters of phosphoric acid. In some embodiments, the nucleating agents are selected from the group consisting of 3,4-dimethyldibenzylidenesorbitol; aluminum-hydroxy-bi s[2,2'-methylene-bis(4,6-di-t-butylphenyl)phosphate]; sodium 2,2'-methylene-bis(4,6-ditertbutylphenyl)phosphate and bicyclo[2.2.1]heptane-2,3-dicarboxylic acid, disodium salt (1R,2R,3R,4S) and HPN-20E that contains Zinc compounds and 1,2-ciclohexanedicarboxylic acid calcium salt. In some embodiments, the nucleating agent may be added to the propylene terpolymer by melt blending the nucleating agent and the propylene terpolymer under shear condition in a conventional extruder.

In some embodiments, the nucleating agent is an inorganic additive selected from the group consisting of talc, silica and kaolin. In some embodiments, the nucleating agent is a salt of monocarboxylic or polycarboxylic acids selected from the group consisting of sodium benzoate or aluminum tert-butylbenzoate. In some embodiments, the nucleating agent is a $C_1$-$C_8$-alkyl-substituted derivative of dibenzylidenesorbitol selected from the group consisting of methyldibenzylidenesorbitol, ethyldibenzylidenesorbitol and dimethyldibenzylidenesorbitol. In some embodiments, the nucleating agent is a salt of a diester of phosphoric acid selected from the group consisting of 2,2'-methylenebis(4, 6,-di-tert-butylphenyl)phosphate sodium or lithium salt.

In some embodiments, the propylene terpolymers can be used with additives such as antioxidants, light stabilizers, antiacids, colorants and fillers.

In some embodiments, the MFR of the terpolymer is achieved visbreaking a polymer. In some embodiments, the visbreaking agent is a peroxide.

The following not-limiting examples are given to better illustrate the present disclosure.

EXAMPLES

The following characterization methods were used in testing the propylene terpolymers produced.

Determination of the Comonomer Content:

The comonomers content were determined by infrared spectroscopy by collecting the IR spectrum of the sample vs. an air background with a Fourier Transform Infrared spectrometer (FTIR) the instrument data acquisition parameters are:
 purge time: 30 seconds minimum
 collect time: 3 minutes minimum
 apodization: Happ-Genzel
 resolution: 2 cm-1.

Sample Preparation:

Using a hydraulic press, a thick sheet was obtained by pressing about 1 gram of sample between two aluminum foils. If homogeneity was questionable, a minimum of two pressing operations occurred. A small portion was cut from the sheet to mold a film. The film thickness ranges was between 0.02-:0.05 cm (8-20 mils).

Pressing temperature was 180±10° C. (356° F.) and a pressure of about 10 kg/cm2 (142.2 PSI) was applied for about one minute. The pressure was released, and the sample was removed from the press. The sample was cooled to room temperature.

The spectrum of a pressed film of the polymer was recorded in absorbance vs. wavenumbers (cm-1). The following measurements were used to calculate ethylene and 1-butene content:

Area (At) of the combination absorption bands between 4482 and 3950 cm-1 which was used for spectrometric normalization of film thickness.

Area (AC2) of the absorption band between 750-700 cm-1 after two proper consecutive spectroscopic subtractions of an isotactic non additivate polypropylene spectrum and then of a reference spectrum of an 1-butene-propylene random copolymer in the range 800-690 cm-1.

Height (DC4) of the absorption band at 769 cm-1 (maximum value), after two proper consecutive spectroscopic subtractions of an isotactic non additivate polypropylene spectrum and then of a reference spectrum of an ethylene-propylene random copolymer in the range 800-690 cm-1.

In order to calculate the ethylene and 1-butene content calibration, straights lines for ethylene and 1-butene obtained by using control samples of ethylene and 1-butene were needed:

Calibration of Ethylene:

Calibration straight line was obtained by plotting AC2/At versus ethylene molar percent (% C2 m). The slope GC2 was calculated from a linear regression.

Calibration of 1-Butene

A calibration straight line was obtained by plotting DC4/At versus butene molar percent (% C4 m). The slope GC4 was calculated from a linear regression.

Spectrum of the sample was recorded and then (At), (AC2) and (DC4) of the sample were calculated. The ethylene content (% molar fraction C2 m) of the sample was calculated as follows:

$$\% \ C2m = \frac{1}{G_{C2}} \cdot \frac{A_{C2}}{A_t}$$

The 1-butene content (% molar fraction C4 m) of the sample was calculated as follows:

$$\% \ C4m = \frac{1}{G_{C4}} \cdot \left(\frac{A_{C4}}{A_t} - I_{C4}\right)$$

The propylene content (molar fraction C3 m) was calculated as follows:

$$C3m = 100 - \% \ C4m - \% \ C2m$$

The ethylene, 1-butene contents by weight were calculated as follows:

$$\% \ C2 \ \text{wt} = 100 \cdot \frac{28 \cdot C2m}{(56 \cdot C4m + 42 \cdot C3m + 28 \cdot C2m)}$$

$$\% \ C4 \ \text{wt} = 100 \cdot \frac{56 \cdot C4m}{(56 \cdot C4m + 42 \cdot C3m + 28 \cdot C2m)}$$

Solubility in xylene: 2.5 g of polymer was dissolved in 250 ml of xylene at 135° C. under agitation. After 20 minutes, the solution was allowed to cool to 25° C., still under agitation, and then allowed to settle for 30 minutes. The precipitate was filtered with filter paper. The solution was evaporated under nitrogen flow. The residue was dried under vacuum at 80° C. until constant weight was reached. The percent by weight of polymer soluble and insoluble at room temperature (25° C.) were then calculated.

Melt Flow Rate (MFR"L"): Determined according to ISO 1133 230° C., 2.16 kg.

Flexural modulus: Determined according to the ISO 178 method.

Melting temperature: Melting temperature and crystallization temperature: Determined by differential scanning calorimetry (DSC). weighting 6±1 mg, was heated to 220±1° C. at a rate of 20° C./min and kept at 220±1° C. for 2 minutes in nitrogen stream. The sample was then cooled at a rate of 20° C./min to 40±2° C., then kept at that temperature for 2 min to allow crystallization of the sample. Then, the sample was fused at a temperature rise rate of 20° C./min up to 220° C.±1. The melting scan was recorded. A thermogram was obtained. The melting temperatures and crystallization temperatures were read.

Sealing Initiation Temperature (S.I.T.):

Determined as follows.

Preparation of the Film Specimens

Films with a thickness of 50 μm were prepared by extruding each test composition in a single screw Collin extruder (length/diameter ratio of screw: 25) at a film drawing speed of 7 m/min. and a melt temperature of 210-250° C. Each resulting film was superimposed on a 1000 μm thick film of a propylene homopolymer having an isotacticity index of 97 and a MFR L of 2 g/10 min. The superimposed films were bonded to each other in a Carver press at 200° C. under a 9000 kg load, which was maintained for 5 minutes.

The resulting laminates were stretched longitudinally and transversally, i.e. biaxially, by a factor 6 with a TM Long film stretcher at 150° C., thus obtaining a 20 μm thick film (18 μm homopolymer+2 μm test composition).

2×5 cm specimens were cut from the films.

Determination of the S.I.T.

For each test, two of the specimens were superimposed in alignment, the adjacent layers being layers of the test composition. The superimposed specimens were sealed along one of the 5 cm sides with a Brugger Feinmechanik Sealer, model HSG-ETK 745. Sealing time was 0.5 seconds at a pressure of 0.1 N/mm². The sealing temperature was increased for each seal, starting from about 10° C. less than the melting temperature of the test composition. The sealed samples were left to cool and then their unsealed ends were attached to an Instron machine where the samples were tested at a traction speed of 50 mm/min.

The S.I.T. was the minimum sealing temperature at which the seal does not break when a load of at least 2 Newtons was applied in the test conditions.

Haze (on 50 μm mm Plaque):

Determined on 50 μm thick cast films of the test composition. The measurement was carried out on a 50×50 mm portion cut from the central zone of the film.

The instrument used for the test was a Gardner photometer with Haze-meter UX-10 equipped with a G.E. 1209 lamp and filter C. The instrument calibration was made by carrying out a measurement in the absence of the sample (0% Haze) and a measurement with intercepted light beam (100% Haze).

Example 1 and Comparative Examples 2-3

Propylene terpolymers were prepared by polymerizing propylene, ethylene and butene-1 in the presence of a highly stereospecific Ziegler-Natta catalyst.

The following paragraph describes the preparation of the solid catalyst component.

Preparation of the Solid Catalyst Component

Into a 2000 mL five-necked glass reactor, equipped with mechanical stirrer, jacket and a thermocouple, purged with nitrogen, 1000 mL of $TiCl_4$ were introduced. The reactor was cooled at −5° C. While stirring, 60.0 g of microspheroidal $MgCl_2.1.7C_2H_5OH$ having an average particle size of 58 μm (prepared according to example 1 of European Patent No. EP728769, incorporated herein by reference) was added at −5° C. The temperature was raised at 40° C. An amount of diethyl 2,3-diisopropylsuccinate sufficient to yield a Mg/succinate molar ratio of 13, was added. The temperature was raised to 100° C. and kept at this value for 60 min. The stirring was stopped for 15 min, and the solid was allowed to settle. The liquid was siphoned off After siphoning, fresh $TiCl_4$ and an amount of 9,9-bis(methoxymethyl)fluorene sufficient to yield a Mg/diether molar ratio of 26, was added. Then the temperature was raised to 110° C. and kept for 30 minutes under stirring. The reactor was then cooled at 75° C. The stirrer was stopped for 15 min. After sedimentation and siphoning, fresh $TiCl_4$ was added. Then the temperature was raised to 90° C. The suspension was stirred for 15 min. The temperature was then decreased to 75° C., and the stirrer was stopped, for 15 min. After sedimentation and siphoning, the solid was washed six times with anhydrous hexane (6×1000 ml) at 60° C. and one time with hexane at 25° C. The solid was dried in a rotavapor.

Preparation of the Catalyst System

Before introducing the solid catalyst component into the polymerization reactors, the solid catalyst component was contacted with aluminum-triethyl (TEAL) and dicyclopentyl-dimethoxysilane (DCPMS) at a temperature of 15° C.

The propylene terpolymers of the examples were prepared in a single gas-phase polymerization reactor having two interconnected polymerization zones, a riser and a downcomer, as described in the European Patent No. EP782587, incorporated herein by reference.

Into the polymerisation reactor, the propylene terpolymers were produced by feeding in a continuous and constant flow the prepolymerized catalyst system, hydrogen (used as molecular weight regulator), propylene, ethylene and butene-1 in the gas state (the feeding quantities expressed in mol/mol were as shown in Table 1). The polymer particles exiting from the polymerization step were subjected to a steam treatment to remove the unreacted monomers and dried.

Table 1 shows the process parameters of the polymerization of the propylene terpolymers of examples 1-2.

Table 2 shows the properties measured on the propylene terpolymers produced in examples 1-2 and comparative example 3.

TABLE 1

| Ex | comp 2 | ex 1 | comp 3 |
|---|---|---|---|
| Temperature, ° C. | 70 | 70 | 70 |
| TEA/CAT, g/g | 6 | 6 | 6 |
| TEAL/Ext. Donor, g/g | 4 | 4 | 4 |
| PREPOLYMERIZATION | | | |
| Temperature, ° C. | 70 | 70 | 70 |
| POLYMERIZATION | | | |
| Temperature, ° C. | 70 | 70 | 70 |
| Pressure, bars | 23 | 23 | 23 |
| residence time min | 90 | 90 | 90 |
| H2/C3, mole/mol | 0.012 | 0.014 | 0.012 |
| C2/C2 + C3 mol/mol | 0.04 | 0.025 | 0.022 |
| C4/C4 + C3, mol/mol | 0.032 | 0.070 | 0.092 |
| MFR, g/10 min | 0.98 | 0.62 | 0.79 |

C2 ethylene, C3 propylene, C4 1-butene

The polymer particles of examples 1-3 were introduced in an extruder, wherein the polymer particles were mixed with 500 ppm of Irganox 1010 and 1000 ppm of Irgafos 168, 500 ppm of Ca stearate and 270 ppm of PEROXAN HX. The mixtures were extruded under nitrogen atmosphere in a twin screw extruder, at a rotation speed of 250 rpm and a melt temperature of 200-250° C.

TABLE 2

| Example | comp 2<br>4-837 | ex 1<br>4-838 | comp 3<br>4-839 |
|---|---|---|---|
| Ethylene content, wt % | 4.8 | 3.7 | 3.1 |
| Butene content, wt % | 1.2 | 3.7 | 5.0 |
| Ethylene to Butene-1 ratio | 4.0 | 1.0 | 0.6 |
| XS, wt % | 16.8 | 14.9 | 16.7 |
| MFR, g/10 min | 5.5 | 5.9 | 6.0 |
| Melting Temperature, ° C. | 133.1 | 130.2 | 130.3 |
| SIT, ° C. | 110.0 | 107.0 | 107.0 |
| Haze on 50 μm film, % | 0.19 | 0.10 | 0.20 |
| Flexural modulus, MPa | 500 | 520 | 550 |

What is claimed is:

1. A propylene, ethylene, 1-butene terpolymer comprising:
   a) from about 3.3 to about 4.6 wt %, of ethylene derived units, based upon the total weight of the terpolymer; and
   b) from about 2.8 wt % to 4.2 wt % of 1-butene derived units, based upon the total weight of the terpolymer; and having
      i) a ratio of C2 wt %/C4 wt % in the range from about 0.9 to about 1.3; wherein C2 wt % is the weight percent of ethylene derived units and C4 wt % is the weight percent of 1-butene derived units, both weight percentages based upon the total weight of the terpolymer;
      ii) a Melt flow rate (determined according to ISO 1133 230° C., 2.16 kg) in the range from about 1.0 to about 30.0 g/10 min, and
      iii) a xylene soluble fraction at 25° C. between about 10 wt % and about 30 wt %, based upon the total weight of the terpolymer.

2. The propylene, ethylene, 1-butene terpolymer according to claim 1 wherein the ratio C2 wt %/C4 wt % ranges from about 0.9 to about 1.2.

3. The propylene, ethylene, 1-butene terpolymer according to claim 1 wherein the ethylene derived units ranges from about 3.5 wt % to about 4.4 wt %, based upon the total weight of the terpolymer, and the 1-butene derived units ranges from about 3.2 wt % to about 4.0 wt %, based upon the total weight of the terpolymer.

4. The propylene, ethylene, 1-butene terpolymer according to claim 1 having a haze measured on 50 μm cast film lower than about 0.18%.

5. The propylene, ethylene, 1-butene terpolymer according to claim 1 having a sealing initiation temperature (SIT) lower than about 110.0° C.

6. A film comprising:
   (A) a propylene, ethylene, 1-butene terpolymer comprising:
      a) from about 3.3 to about 4.6 wt % of ethylene derived units, based upon the total weight of the terpolymer; and
      b) from about 2.8 wt % to 4.2 wt % of 1-butene derived units, based upon the total weight of the terpolymer; and having
         i) a ratio of C2 wt %/C4 wt % in the range from about 0.9 to about 1.3; wherein C2 wt % is the weight percent of ethylene derived units and C4 wt % is the weight percent of 1-butene derived units, both weight percentages based upon the total weight of the terpolymer;
         ii) a Melt flow rate (determined according to ISO 1133 230° C., 2.16 kg) in the range from about 1.0 to about 30.0 g/10 min, and
         iii) a xylene soluble fraction at 25° C. between about 10 wt % and about 30 wt %, based upon the total weight of the terpolymer.

7. The film according to claim 6 further comprising:
(B) a nucleating agent.

* * * * *

UNITED STATES PATENT AND TRADEMARK OFFICE
CERTIFICATE OF CORRECTION

PATENT NO. : 10,875,945 B2
APPLICATION NO. : 15/559374
DATED : December 29, 2020
INVENTOR(S) : Marzolla et al.

It is certified that error appears in the above-identified patent and that said Letters Patent is hereby corrected as shown below:

On the Title Page

Item (30), Line 1, delete "15159865" and insert -- 15159865.3 --, therefor

In the Specification

In Column 4, Line 40, delete "dicyclopentyldimethoxysilne," and insert
-- dicyclopentyldimethoxysilane, --, therefor In Column 4, Line 43, delete "1, trifluoropropy 1-metil-dimethoxysilane." and insert -- 1, trifluoropropy 1-methyl-dimethoxysilane. --, therefor In Column 5, Line 9, delete "1,2-ciclohexanedicarboxylic" and insert
-- 1,2-cyclohexanedicarboxylic --, therefor Signed and Sealed this
Twenty-fifth Day of October, 2022

Katherine Kelly Vidal
*Director of the United States Patent and Trademark Office*